United States Patent [19]
Nishimura et al.

[11] Patent Number: 5,662,729
[45] Date of Patent: Sep. 2, 1997

[54] SHAPED BODY OF HYDROGEN ABSORBING ALLOY AND CONTAINER PACKED WITH HYDROGEN ABSORBING ALLOY

[75] Inventors: Koichi Nishimura, Suita; Takahiro Yonesaki, Ora-gun; Shin Fujitani, Hirakata; Hiroshi Nakamura, Neyagawa; Yumiko Nakamura, Moriguchi; Ikuo Yonezu; Hiroshi Watanabe, both of Hirakata, all of Japan

[73] Assignee: Sanyo Electric Co., Ltd., Osaka, Japan

[21] Appl. No.: 538,371

[22] Filed: Oct. 3, 1995

[30] Foreign Application Priority Data

| Oct. 4, 1994 | [JP] | Japan | 6-239939 |
| Oct. 7, 1994 | [JP] | Japan | 6-270508 |
| Oct. 31, 1994 | [JP] | Japan | 6-266444 |

[51] Int. Cl.$^6$ .................................. C22C 19/03
[52] U.S. Cl. .................. 75/252; 75/231; 420/455; 420/900
[58] Field of Search ............... 75/231, 246, 252, 75/255; 420/455, 460, 900

[56] References Cited

U.S. PATENT DOCUMENTS

| 3,918,933 | 11/1975 | Martin | 420/455 |
| 4,368,143 | 1/1983 | de Pous | 75/255 |

FOREIGN PATENT DOCUMENTS

| 55-29921 | 8/1980 | Japan . |
| 55-158101 | 12/1980 | Japan . |
| 56-18521 | 4/1981 | Japan . |
| 56-109802 | 8/1981 | Japan . |
| 57-38302 | 3/1982 | Japan . |
| 59-73401 | 4/1984 | Japan . |
| 59-83901 | 5/1984 | Japan . |
| 59-147032 | 8/1984 | Japan . |
| 61-209901 | 9/1986 | Japan . |
| 62-4321 | 1/1987 | Japan . |
| 63-79701 | 4/1988 | Japan . |
| 63-112401 | 5/1988 | Japan . |
| 63-147801 | 6/1988 | Japan | 420/900 |
| 1-119501 | 5/1989 | Japan . |
| 1-246101 | 10/1989 | Japan . |

Primary Examiner—George Wyszomierski
Attorney, Agent, or Firm—Nikaido, Marmelstein, Murray & Oram LLP

[57] ABSTRACT

A shaped body of hydrogen absorbing alloy prepared by pressing a mixture of a hydrogen absorbing alloy powder A having a first particle-size distribution, a hydrogen absorbing alloy powder B having a second particle-size distribution and a binder C. The powder A is larger than the powder B in mean particle size. The mixture has a mean particle size ratio $r_B/r_A$ of the powder B to the powder A, wherein $r_A$ and $r_B$ are the mean particle sizes of the respective powders A and B of at least 0.03 to not greater than 0.50. The hydrogen absorbing alloy of the powder B has a higher rate of progress of pulverization resulting from absorption and desorption of hydrogen than the hydrogen absorbing alloy of the powder A.

14 Claims, 12 Drawing Sheets

RATIO $(r_B + 2\sigma_B)/(r_A - 2\sigma_A)$

SHAPED BODY OF HYDROGEN ABSORBING ALLOY AND CONTAINER PACKED WITH HYDROGEN ABSORBING ALLOY

FIELD OF THE INVENTION

The present invention relates to hydrogen absorbing alloys adapted to reversibly absorb and desorb hydrogen, and more particularly to shaped bodies of hydrogen absorbing alloys which can be prepared by pressing a powder of such alloy into a required shape and also to containers containing the hydrogen absorbing alloy parked to a high density.

BACKGROUND OF THE INVENTION

Various hydrogen absorbing alloy application systems, such as heat pumps, hydrogen storage systems and fuel cell systems, have been developed which utilize the hydrogen storage function or thermal energy conversion function of hydrogen absorbing alloys.

With such systems it is the practice to pulverize to a powder, an ingot of hydrogen absorbing alloy which has been obtained by melting, fill the powder into a container of specified capacity and cause the alloy to abrorb and desorb hydrogen. In this case, it is desired to pack the container with a large amount of the alloy by diminishing the voids within the container to the greatest possible extent. However, the powder obtained by pulverizing the ingot of hydrogen absorbing alloy has irregularly shaped particle surfaces, includes many voids among the particles and is therefore difficult to pack into the container to a high density. More specifically stated, in the case where particles of approximately same size are packed into a container of specified capacity, the volume ratio of the voids formed inside the container per unit volume thereof, i.e., void fraction, is difficult to decrease to below 0.5 which is the limit value of void fraction when the particles are assumed to be spherical, because the particles are not spherical.

Since the particles of hydrogen absorbing alloy repeatedly expands and contracts with the absorption and desorption of hydrogen, the resulting stress acts on the wall of the container, possibly deforming the container. Especially when the alloy particles are more finely divided and scatter during the repeated expansion and contraction, the fine particles progress toward, and concentrate in the bottom of the container, almost eliminating the interstices between the alloy particles in the bottom portion of the container. As a result, the expansion of the alloy in this area acts directly on the container wall, deforming the container and possbily causing a break in the wall. This gives rise to the problem of so-called "swelling." Accordingly, the powder of the hydrogen absorbing alloy is conventionally pelletized, as will be described below, to cope with this problem.

According to a first method of pelletization, a polymeric material is mixed with the alloy powder, and the mixture is pelletized by heating (JP-B-18521/1981, JP-A-147032/1984, JP-A-119501/1989 and JP-A-246101/1989). For example, JP-B-18521 discloses a pelletizing method wherein a viscoelastic substance comprising a polymeric material is admixed with the alloy powder, and the mixture is enclosed with a covering material of porous plate, followed by sintering. Another method is known wherein an elastic material comprising a high polymer is admixed with the alloy powder, and the mixture is packed into shells of porous material for pelletization (JP-A-83901/1984).

According to a second method, a ceramic is admixed with the alloy powder, and the mixture is pelletized as by sintering (JP-A-158101/1980, JP-A-209901/1986, JP-A-73401/1984 and JP-A-38302/1982).

A third method comprises admixing aluminum or like metal with the alloy powder and pelletizing the mixture as by sintering (JP-B-29921/1980, JP-A-109802/1981, JP-B-4321/1987, JP-A-79701/1988 and JP-A-112401/1988). For example, JP-B-29921/1980 uses Al, Sn, Zn or the like as a binder, while JP-A-109802/1981 and JP-B-4321/1987 use Al, Ni, Cu or like metal as a binder.

However, the pelletization of the first to third methods described requires a heat treatment or packing of the powder into porous shells or the like and therefore has the problem of making the production process complex. Furthermore, the presence of the polymeric material or like binder causes the problem of greatly reducing the ratio (packing fraction) of the hydrogen absorbing alloy in the pellets to below 50% which is the standard packing fraction for conventional containers packed with the alloy powder without the polymeric material. For example, with the pellets of JP-A-246101/1989 wherein $CaNi_5$ is used as the hydrogen absorbing alloy, and a phenolic resin or fluorocarbon resin is used as the polymeric material, the density (true density) of the alloy itself is about 6.6 $g/cm^3$, while the mass (bulk density) of the pellets including interstices per unit volume thereof is 4.12 $g/cm^3$ at its highest. This value is less than 63% of the true density of the alloy particles. Moreover, the volume ratio of the interstices (porosity) is above 26%.

SUMMARY OF THE INVENTION

A first object of the present invention is to provide a shaped body of hydrogen absorbing alloy having a novel structure which is capable of achieving a higher packing fraction than conventional structures of like alloys.

To fulfill the first object, the present invention provides a hydrogen absorbing alloy shaped body which is prepared by admixing a binder comprising a fluorocarbon resin with a powder of the hydrogen absorbing alloy and pressing the resulting mixture to shape. The fluorocarbon resin is, for example, polytetrafluoroethylene (PTFE). The mixing ratio of the binder is 5 to 30 wt. %. More specifically, the shaped body containing hydrogen absorbing alloy is at least 0.63 times the density of the alloy itself in mass per unit volume thereof and the volume ratio of the pores therein is less than 0.2.

With the shaped body of hydrogen absorbing alloy, the particles of the alloy are firmly joined into the structure by the high binding ability of the fluorocarbon resin, while the shapability of the resin permits the alloy powder to be pressed into a desired shape, enabling the alloy to retain its shape. Accordingly, even if the alloy is further reduced in size, by when expanding and contracting during the absorption and desorption of hydrogen, the fine particles are prevented from scattering, whereby the problem of swelling is avoided. Further when the powder of hydrogen absorbing alloy is shaped under pressure, the flexibility of the fluorocarbon resin permits individual alloy particles to penetrate into interstices between other alloy particles to result in an increased packing fraction. When PTFE is used as the fluorocarbon resin, the alloy powder can be formed to a complex shape by virtue of the excellent moldability of PTFE. Further when the mixing ratio of the fluorocarbon resin as a binder is in the range of 5 to 30 wt. %, the packing fraction of the alloy can be increased beyond the conventional value of 50% with the fluorocarbon resin exhibiting sufficiently high binding ability.

A second object of the present invention is to realize high-density packing so as to achieve a void fraction of smaller than 0.5 in packing a container with irregularly shaped particles obtained by pulverizing an ingot of hydrogen absorbing alloy.

To fulfill the second object, the present invention provides a shaped body prepared by pressing a mixture of a hydrogen absorbing alloy powder A having a first particle-size distribution, a hydrogen absorbing alloy powder B having a second particle-size distribution and a binder C, the powder A being larger than the powder B in mean particle size, the mixture being at least 0.03 to not greater than 0.50 in the mean particle size ratio $r_B/r_A$ of the powder B to the powder A wherein $r_A$ is the mean particle size of the power A and $r_B$ is that of the powder B. More specifically, the hydrogen absorbing alloy of the powder B has a higher rate of pulverization, as a result of absorption and desorption of hydrogen, than has the hydrogen absorbing alloy of the powder A. The weight ratio of the powder B to the powder A is at least 0.2 to not greater than 0.8.

To achieve the second object, the present invention also provides a shaped body prepared by pressing together a mixture of a hydrogen absorbing alloy powder A having a first particle-size distribution, a hydrogen absorbing alloy powder B having a second particle-size distribution and a binder C. The powder A is larger than the powder B in mean particle size. The mixture ratio $(r_B+2\sigma_B)/(r_A-2\sigma_A)$ wherein $r_A$ is the mean particle size of the powder A, $\sigma_A$ is the standard deviation of the normal distribution function of particle sizes of the powder A, $r_B$ is the mean particle size of the powder B, and $\sigma_B$ is the standard deviation of normal distribution function of particle sizes of the powder B at least 0.003 to not greater than 0.50. More specifically, the rate of progress of pulverization resulting from absorption and desorption of hydrogen of the hydrogen absorbing alloy of powder B is higher than that of the hydrogen absorbing alloy of powder A. The weight ratio of the powder B to the powder A is at least 0.2 to not greater than 0.8.

When the hydrogen absorbing alloy A, of the larger mean particle size, and the hydrogen absorbing alloy B, of the smaller mean particle size, are mixed together along with the binder C, a mixture is obtained wherein the small particles of powder B are positioned between the large particles of powder A, with the binder suitably interposed between these particles and dispersed throughout the mixture. When placed into a die and pressed for shaping, the mixture is compressed to further diminish the interstices between the particles, and the particles are intimately joined to one another. During the compression, the binder changes to a pastelike form, suitably filling the interstices between the particles to join them to one another. However, voids of sizes sufficient for the passage of hydrogen gas still remain in the shaped body thus obtained.

If the mean particle size ratio $r_B/r_A$ of the powder B to the powder A is greater than 0.5, small particles are unable to enter the interstices between large particles, leaving a larger proportion of voids. On the other hand, if the ratio $r_B/r_A$ is smaller than 0.03, the small particles fill up the interstices between the larger particles, eliminating the voids almost completely. The alloy expands when absorbing hydrogen, so that too small a proportion of voids is undesirable because excessive pressure is then built up which is likely to exert force on the inner wall of the container. Thus, the size ratio $r_B/r_A$ should be at least 0.03 to not greater than 0.50.

In the case where a powder of varying particle sizes is classified with sieves, it is thought that the particle sizes are in normal distribution. As previously mentioned, now suppose the powder A of larger mean particle size is $r_A$ in mean particle size and $\sigma_A$ in standard deviation, and the powder B of small mean particle size is $r_B$ in mean particle size and $\sigma_B$ in standard deviation. When the ratio $(r_B+2\sigma_B)/(r_A-2\sigma_A)$ meets the requirement of being at least 0.03 to not greater than 0.50, about 98% of all the particles are within the range of 0.03 to 0.50 in particle size ratio. Since the remainder, about 2%, is almost negligible in this case, the ratio $(r_B+2\sigma_B)/(r_A-2\sigma_A)$ in the foregoing range makes it possible to pack the powders into the container at a high density with improved filling efficiency.

As to the size reduction of particles, the greater the size of particles of an given alloy material, the higher is the rate of progress of pulverization by hydrogen absorbtion. When two hydrogen absorbing alloy powders which are different in mean particle size are used for repeated cycles of hydrogen absorption and desorption, the difference in particle size decreases with an increase in the number of cycles, and the particles eventually become generally uniform in size, failing to retain the initial ratio $r_B/r_A$ or $(r_B+2\sigma_B)/(r_A-2\sigma_A)$. With the hydrogen absorbing alloy shaped body of the invention, on the other hand, the powder B of smaller mean particle size is higher than the powder A of larger mean particle size in the rate of size reduction of the alloy particles due to the absorption and desorption of hydrogen, with the result a great difference does not occur between the two powders in the rate of progress of pulverization. This enables the shaped body to retain the initial ratio $r_B/r_A$ or $(r_B+2\sigma_B)/(r_A-2\sigma_A)$ and remain packed at a high density.

DETAILED DESCRIPTION OF EMBODIMENTS

First, a description will be given of a case wherein a pellet is prepared as a shaped body of the invention from a powder of hydrogen absorbing alloy having a single particle-size distribution.

Figure 1:
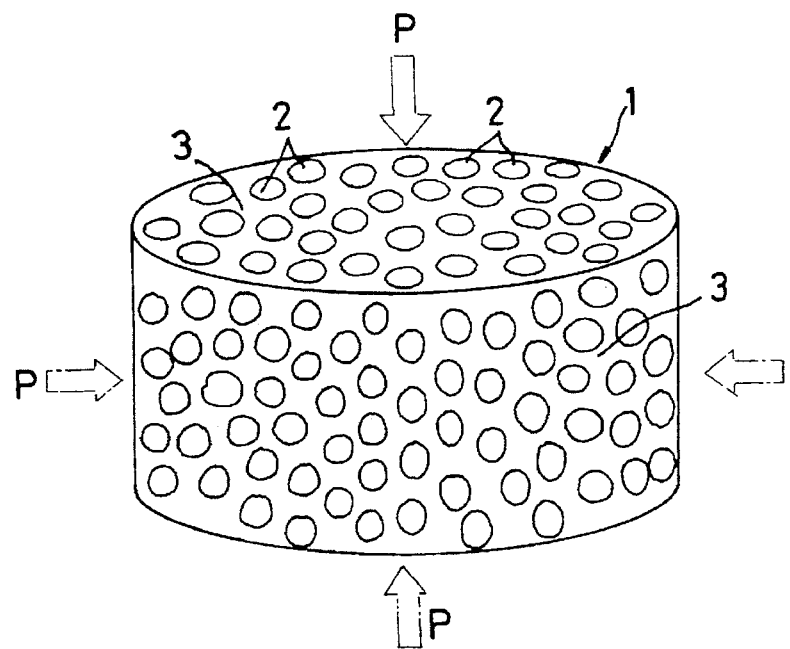
FIG. 1 is a perspective view showing a pellet of hydrogen absorbing alloy embodying the invention.

FIG. 1 shows a pellet 1 of hydrogen absorbing alloy which is prepared from particles 2 of a hydrogen absorbing alloy having, for example, the composition of $LaNi_{4.55}Al_{0.45}$ by joining the particles with a binder 3 which is a fluorocarbon resin, i.e., PTFE (polytetrafluoroethylene) and pressing the mixture to shape. The pellet is in the form of a solid cylinder measuring, for example, 2 cm in diameter and 1 to 2 cm in height. The fluorocarbon resin has resistance to any chemical (acid or alkali) at room temperature and is excellent also in heat resistance. Among the fluorocarbon resins, PTFE especially has outstanding shapability and is therefore usable for preparing the pellet 1 of desired shape.

Figure 6:
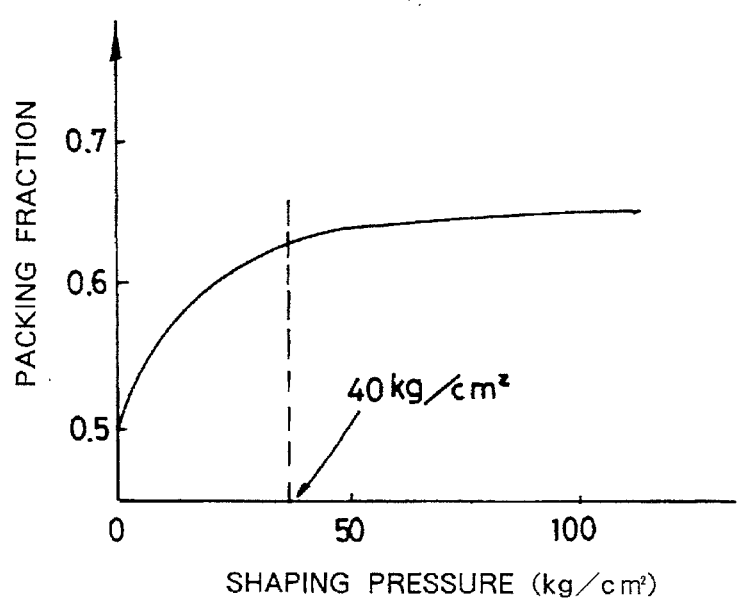
FIG. 6 is a graph showing the relationship between the shaping pressure applied for preparing pellets and the hydrogen absorbing alloy packing fraction.

FIG. 6 shows the relationship between the hydrogen absorbing alloy packing fraction and the pressure applied for shaping pellets of hydrogen absorbing alloy when the mixing ratio of PTFE was about 12 wt. %. The packing fraction increases beyond 0.5 with an increase in the shaping pressure, and levels off at about 0.65. Accordingly, the shaping pressure should be at least 40 kg/cm² at which the packing fraction available is approximately at this saturation level. With the present embodiment, the pressure is set at 100 kg/cm².

Figure 7:
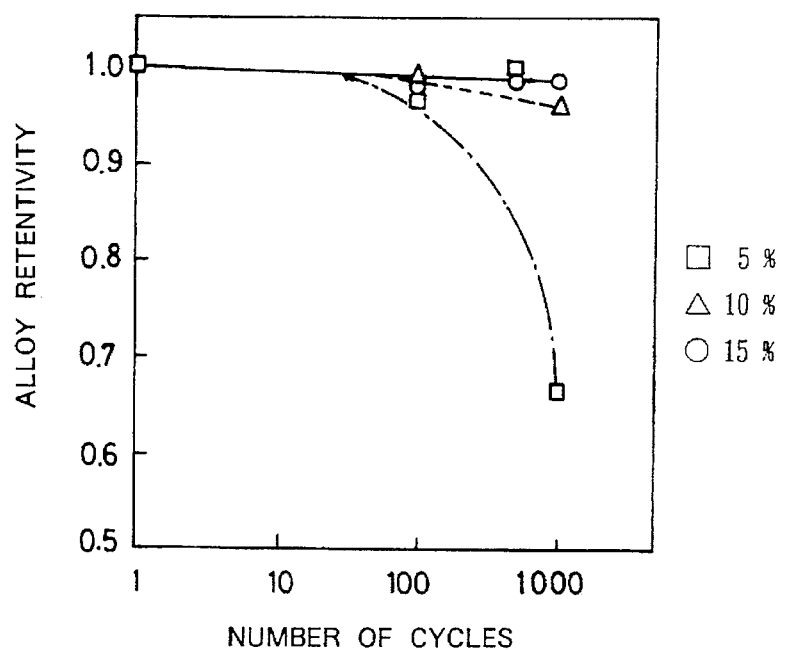
FIG. 7 is a graph showing the relationship between the number of hydrogen absorption-desorption cycles and the alloy retentivity.

FIG. 7 shows variations in the ratio at which the alloy pellet retains its original shape (alloy retentivity) during the process of gradual pulverization of the alloy particles when the pellet is subjected to repeated hydrogen absorption-desorption cycles. The measurements were obtained for PTFE mixing ratios of 5%, 10% and 15%. If the amount of PTFE present is at least 10%, almost no decrease occurs in alloy retentivity as illustrated, but the retentivity greatly decreases if the amount of PTFE is less than 5% and when the number of cycles exceeds 100. Accordingly, the amount of PTFE to be added should be at least 5% on the basis of 100 cycles. The problem of swelling is then avoided.

Figure 8:
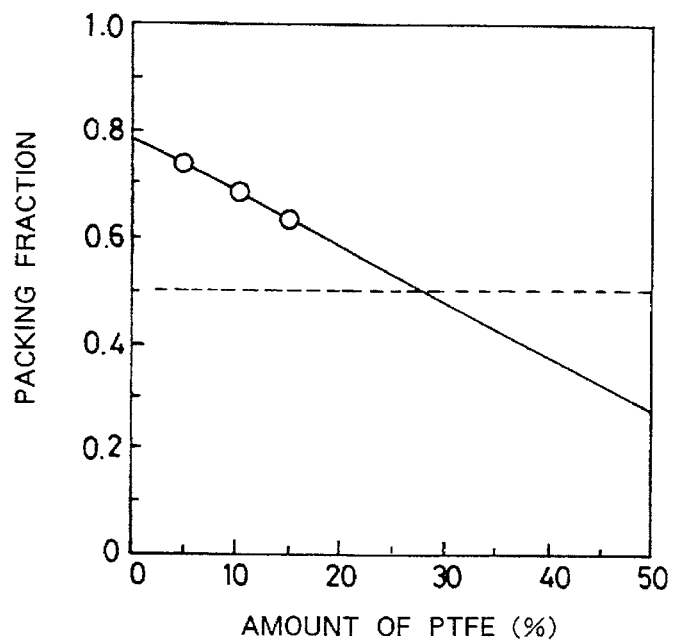
FIG. 8 is a graph showing the relationship between the amount of PTFE added and the hydrogen absorbing alloy packing fraction.

FIG. 8 is a graph showing the relationship between the amount of PTFE added (binder mixing ratio) and the hydrogen absorbing alloy packing fraction, as determined by experiments. The graph indicates that there is a linear relationship between the amount of PTFE and the packing fraction. To obtain a packing fraction higher than the conventional value of 50%, the amount of PTFE should be limited to not greater than about 30%.

In view of the results of FIGS. 7 and 8, the binder mixing ratio is set to the range of at least 5 wt. % to not greater than 30 wt. % according to the present embodiment.

Figure 9:
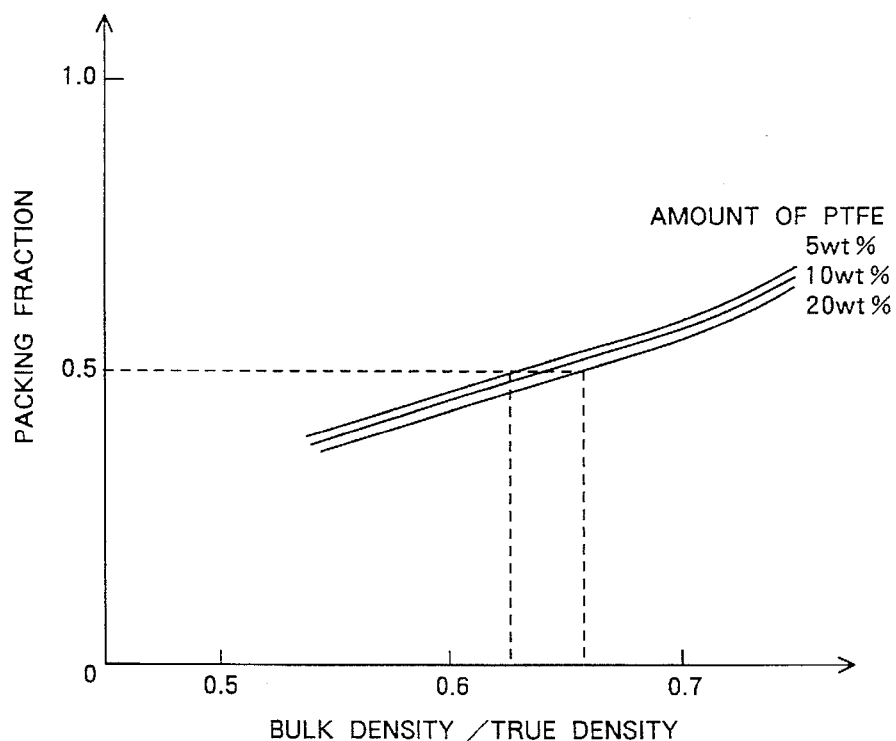
FIG. 9 is a graph showing the relationship between the hydrogen absorbing alloy packing fraction and the ratio of the pellet bulk density to the true density of the hydrogen absorbing alloy.

FIG. 9 is a graph showing the relationship between the hydrogen absorbing alloy packing fraction and the ratio of the pellet bulk density to the true density of the hydrogen absorbing alloy contained in the pellet, with the amount of PTFE taken as a parameter. The relationship was determined by experiments. The graph indicates that to obtain a high packing fraction in excess of 50%, the ratio of the bulk density to the true density must be at least 0.63 when the amount of PTFE added is 5 wt. %. Further when the amount of PTFE is 20 wt. %, the ratio needs to be at least 0.66.

Figure 10:
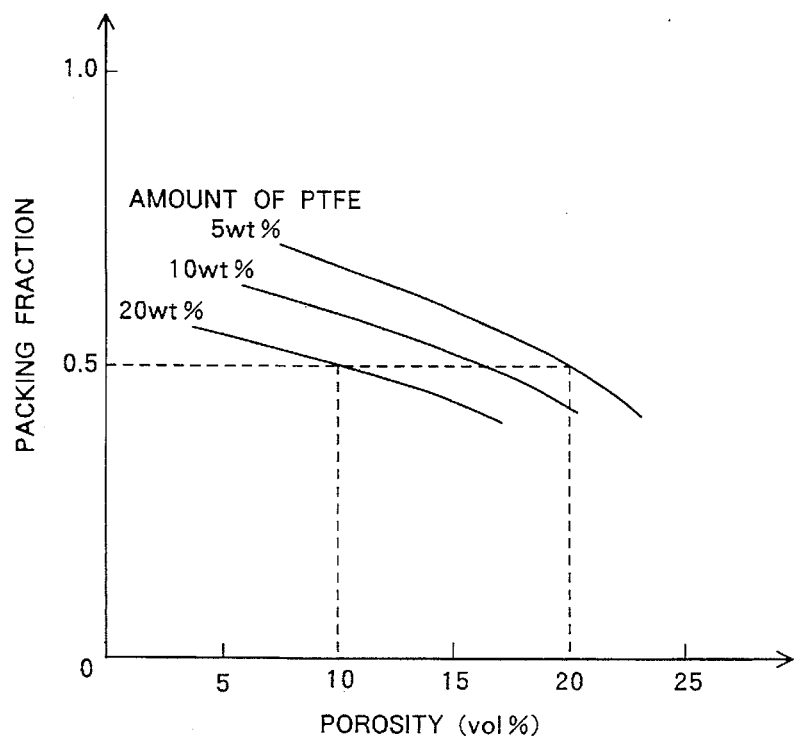
FIG. 10 is a graph showing the relationship between the porosity of the pellet and the hydrogen absorbing alloy packing fraction.

FIG. 10 is a graph showing the relationship between the porosity of the pellet and the hydrogen absorbing alloy packing fraction as determined by experiments. The graph reveals that to obtain a high packing fraction exceeding 50%, the porosity should be less than 20% when the amount of PTFE added is 5 wt. %. The porosity will be up to 10% when the amount of PTFE is 20 wt. %.

According to the present embodiment, therefore, the pellet bulk density should be at least 0.63 times the true density of the alloy, and the porosity should be less than 20%.

The pellet 1 of FIG. 1 is shaped by filling a die (not shown) with specified amounts of the kneaded mixture of a finely divided hydrogen absorbing alloy 2 and PTFE and applying a pressure P of 100 kg/cm² to the die contents. Heating is not necessary for this process. As a result, the alloy particles 2 are joined to one another through the PTFE, and the pellet 1 is obtained in a specified shape in conformity with the internal shape of the die.

Figure 2:
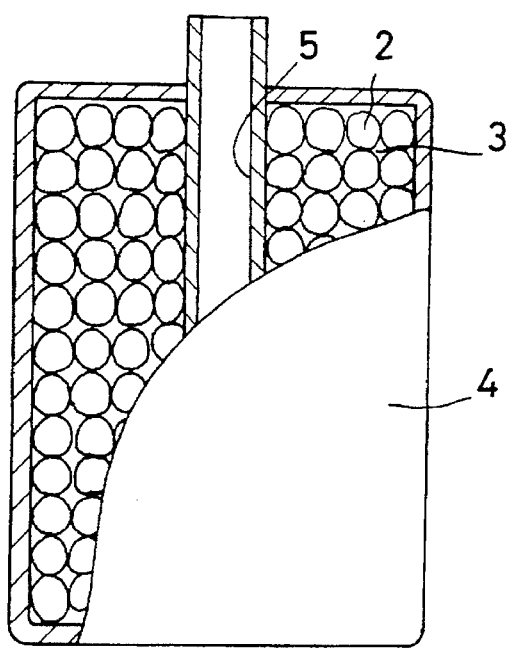
FIG. 2 is a front view partly broken away and showing a hydrogen storage tank.

FIG. 2 shows a hydrogen storage tank embodying the present invention. A pellet of the invention comprising hydrogen absorbing alloy particles 2 and a binder 3 is accommodated in a tank container 4. Installed in the center of the container 4 is a hollow cylindrical sintered filter 5 providing a channel for the supply of hydrogen.

While the alloy particles 2 of the storage tank repeatedly absorb and desorb hydrogen, the expansion and contraction of the particles 2 are absorbed or mitigated by the PTFE serving as the binder 3. This prevents an objectionable force from acting on the container 4. The wall of the container 4 therefore can be of a smaller thickness than has conventionally been used and need not be given a special shape for reinforcement.

Conventional hydrogen storage tanks have a plurality of filters 5 for reducing the pressure loss due to the transfer of hydrogen, whereas with the alloy pellet of the present invention, the binder 3 itself is sufficiently porous to fully ensure the passage of hydrogen, so that the pressure loss is smaller, and the number of filters 5 can be smaller than is conventionally needed.

The container 4 shown in FIG. 2 can be packed with many pellets of the small size shown in FIG. 1. Alternatively, an alloy pellet of large size shaped in conformity with the shape of the container 4 can be accommodated therein.

Figure 3:
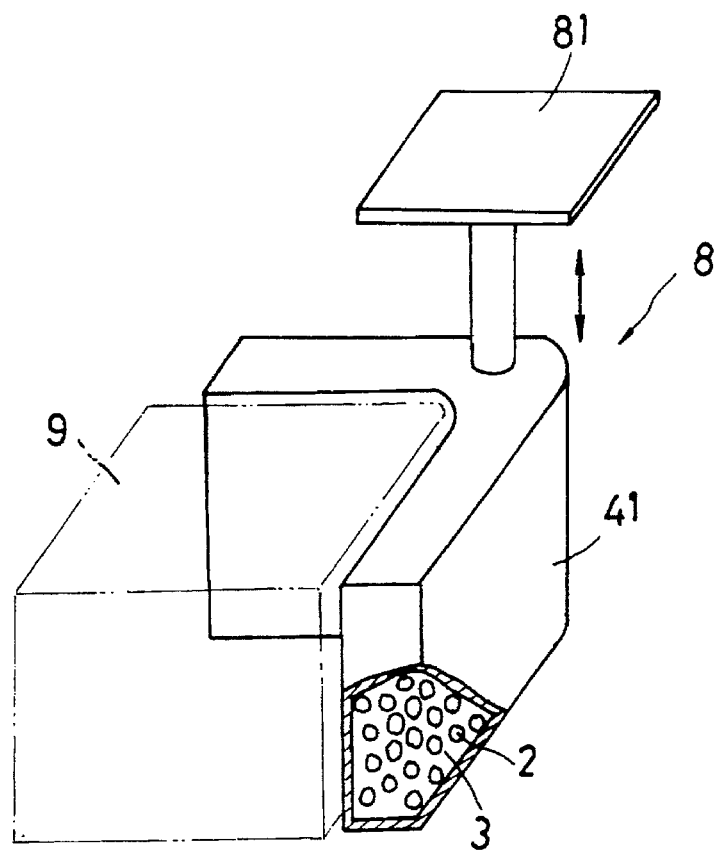
FIG. 3 is a perspective view partly broken away and showing an actuator.

FIG. 3 shows a hydrogen absorbing alloy pellet of the invention as used in an actuator 8. The pellet comprises hydrogen absorbing alloy particles 2 and a binder 3 and is prepared in a specified shape by pressing and accommodated in a container 41 for raising and lowering a lift table 81 by means of the absorption and desorption of hydrogen.

Since the PTFE which is used as the binder 3 in the pellet of the invention is excellent in moldability, the alloy pellet can be made in any desired shape. For example, the pellet can be L-shaped as illustrated so as to avoid interference with another device 9. This precludes occurrence of a dead space in arranging a plurality of units or devices so as to render the overall apparatus or system more compact.

Figure 4:
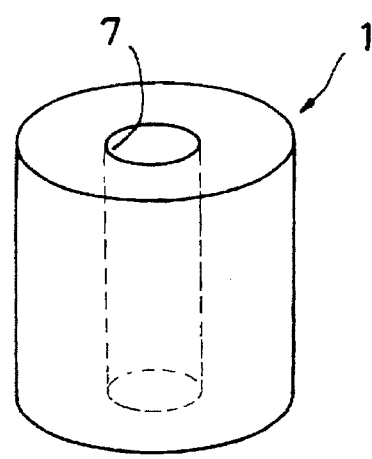
FIG. 4 is a perspective view showing a pellet of hydrogen absorbing alloy having a through hole.

As shown in FIG. 4, the hydrogen absorbing alloy pellet 1 can be in the form of a hollow cylinder having a through hole 7 in its center. For example when the container 4 of FIG. 2 is packed with a multiplicity of such pellets 1 to provide a hydrogen storage tank, the through holes 7 of the pellets form passages for hydrogen, whereby the filter 5 can be dispensed with.

In the case where the pellet of the present invention is used for providing a heat exploiting system, a powder of aluminum, copper or like metal is added to the pellet to improve the heat transfer efficiency of the pellet.

Figure 11:
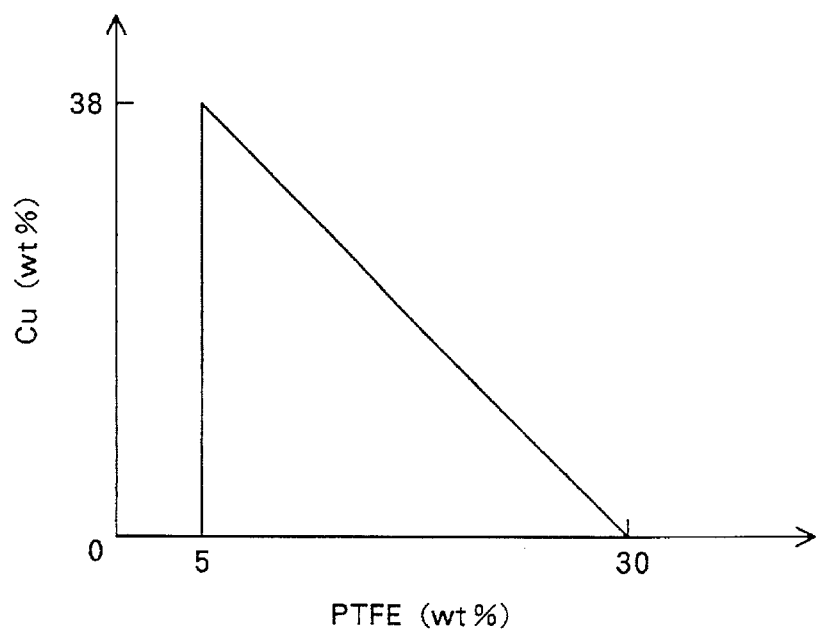
FIG. 11 is a graph showing the proper amounts of copper to be added relative to varying amounts of PTFE added.

FIG. 11 shows the relationship between the proper amount of copper to be added and the amount of PTFE added. When 5 wt. % of PTFE is used, the proper amount of copper to be added is 38 wt. %. As the amount of PTFE added increases to 30 wt. %, the amount of copper to be added is decreased to 0.

Figure 12:
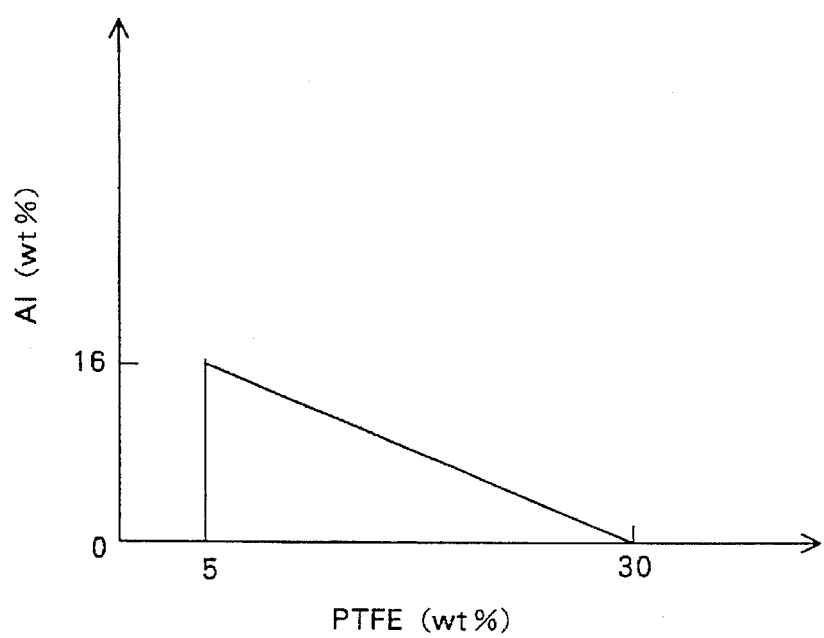
FIG. 12 is a graph showing the proper amounts of aluminum to be added relative to varying amounts of PTFE added.

FIG. 12 shows the relationship between the proper amount of aluminum to be added and the amount of PTFE added. When 5 wt. % of PTFE is used, the proper amount of aluminum to be added is 16 wt. %. As the amount of PTFE added increases to 30 wt. %, the amount of aluminum to be added is decreased to 0.

Figure 5:
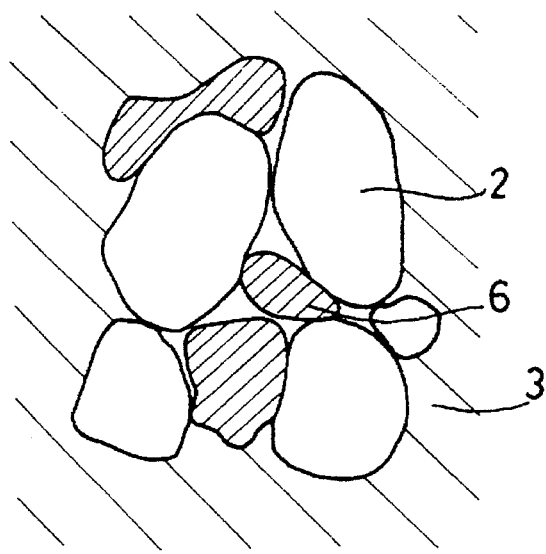
FIG. 5 is a diagram showing the structure of a hydrogen absorbing alloy pellet having a metal added thereto.

When the pellet 1 is shaped by pressing, with the metal powder added thereto in an amount adjusted as described above, and then packed into a container, for example, for use in a heat exchanger, metal particles 6 dispersed through the pellet 1 as shown in FIG. 5 are brought into direct contact with heat-exchange fins inside the container to give increased heat conductivity. Further, because the pellet is prevented from swelling by the binder 3, the pellet retains its initial heat conductivity for a central prolonged period of time. If the pellet 1 is formed with a hole as seen in FIG. 4, the heat exchanger not only exhibits improved performance but can also be simplified in construction by omitting a filter.

The pellet of the invention achieves a higher hydrogen absorbing alloy packing fraction than has been conventionally accomplished as previously stated, and further has the advantage of being easy to handle for transport as by a truck. When the hydrogen absorbing alloy is transported in the form of a powder as is done conventionally, a problem is encountered in that the alloy powder will spill or scatter, whereas the alloy pellet of the invention can be transported without an alloy loss.

Next, examples are given below in which pellets were prepared as shaped bodies of the invention from alloy powders which were different in particle-size distribution.

EXAMPLE 1

An ingot of a hydrogen absorbing alloy having the composition of LaNi$_5$ was pulverized, and the particles were classified by twenty sieves which were different in mesh size to obtain a powder about 550 μm in mean particle size and 19 kinds of powders ranging from about 35 μm to about 550 μm in mean particle size and different from one another by about 30 to about 35 μm in mean particle size. The powder of about 550 μm in mean particle size was used as the powder A of large mean particle size. Each of the powders ranging from about 35 μm to about 550 μm was used as the powder B of small mean particle size. The powder A and each powder B were mixed together in the latter to former weight ratio of 0.5.

The void fraction of the mixture having a particular particle size ratio was calculated from the following equation using the bulk density ρ of the mixture (mass, per unit volume, of the mixture including voids) and the true density $\rho_p$ of the mixture (density of the mixture itself) as determined by X-ray analysis.

$$\begin{aligned}
\text{Void fraction} &= (V - V_p)/V \\
&= (V/W - V_p/W)/(V/W) \\
&= (1/\rho - 1/\rho_p)/(1/\rho) \\
&= (\rho_p - \rho)/\rho_p
\end{aligned}$$

wherein V is the bulk volume of the mixture (volume of the mixture including voids), $V_p$ is the substantial volume of the mixture (combined volume of the powders in the mixture) and W is the weight of the mixture.

Figure 17:
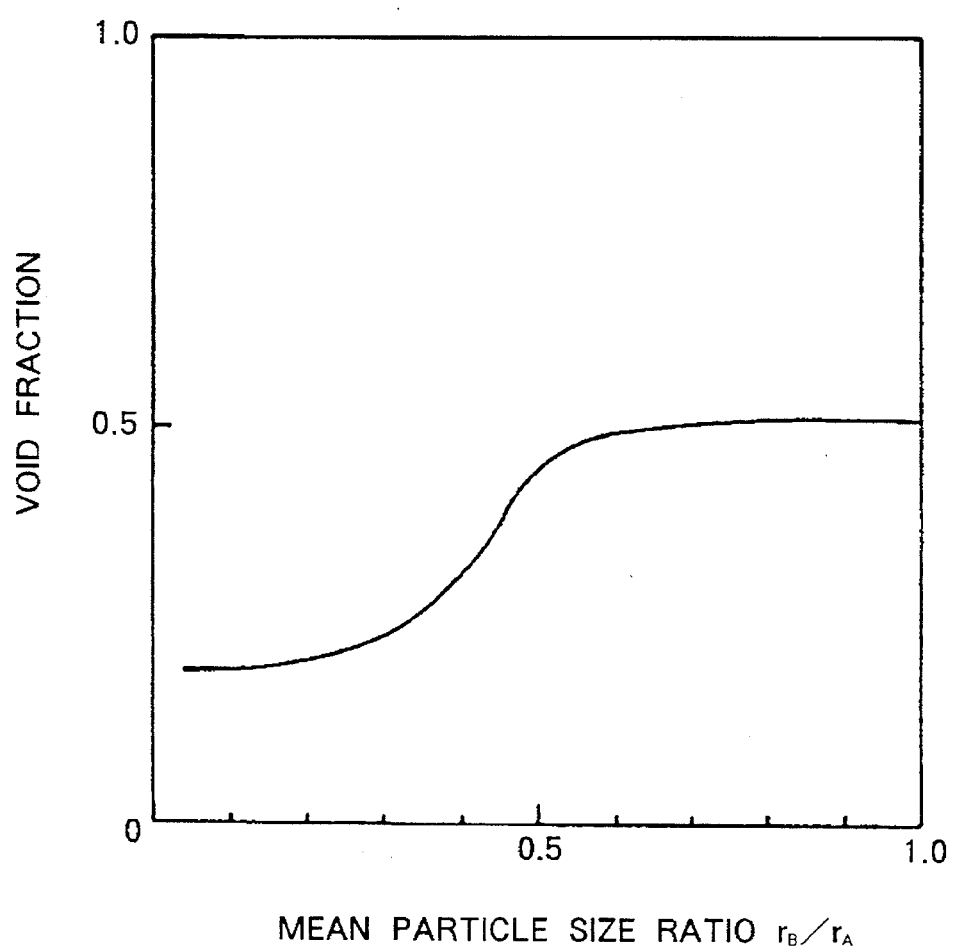
FIG. 17 is a graph showing the relationship between the mean particle size ratio $r_B/r_A$ and the void fraction.

FIG. 17 shows the relationship between the mean particle size ratio ($r_B/r_A$) of the powder B to powder A in the case where the two powders A and B, which are different in particle-size distribution, are mixed together. As will be apparent from the graph, the void fraction is generally constant when the mean particle size ratio ($r_B/r_A$) is not smaller than about 0.6, but the void fraction decreases greatly as the ratio decreases from about 0.6. Accordingly, the particle size ratio ($r_B/r_A$) should be up to 0.5, preferably up to 0.4, more preferably up to 0.3.

However, if the mean particle size ratio is too small, the small particles fill up the interstices between the large particles, eliminating the voids almost completely and entailing the likelihood of the container breaking owing to, expansion due to the absorption of hydrogen, so that the ratio should be at least 0.03.

EXAMPLE 2

In the same manner as in Example 1, particles different in size were prepared, which were classified to obtain a powder A, about 550 μm in mean particle size and 16.7 μm in standard deviation, and 19 kinds of powders B ranging from about 35 μm to about 550 μm in mean particle size and 16.7 μm in standard deviation. The powder A and each of the powders B were mixed together so that the weight ratio of the powder B to the powder A was 0.5.

Figure 18:
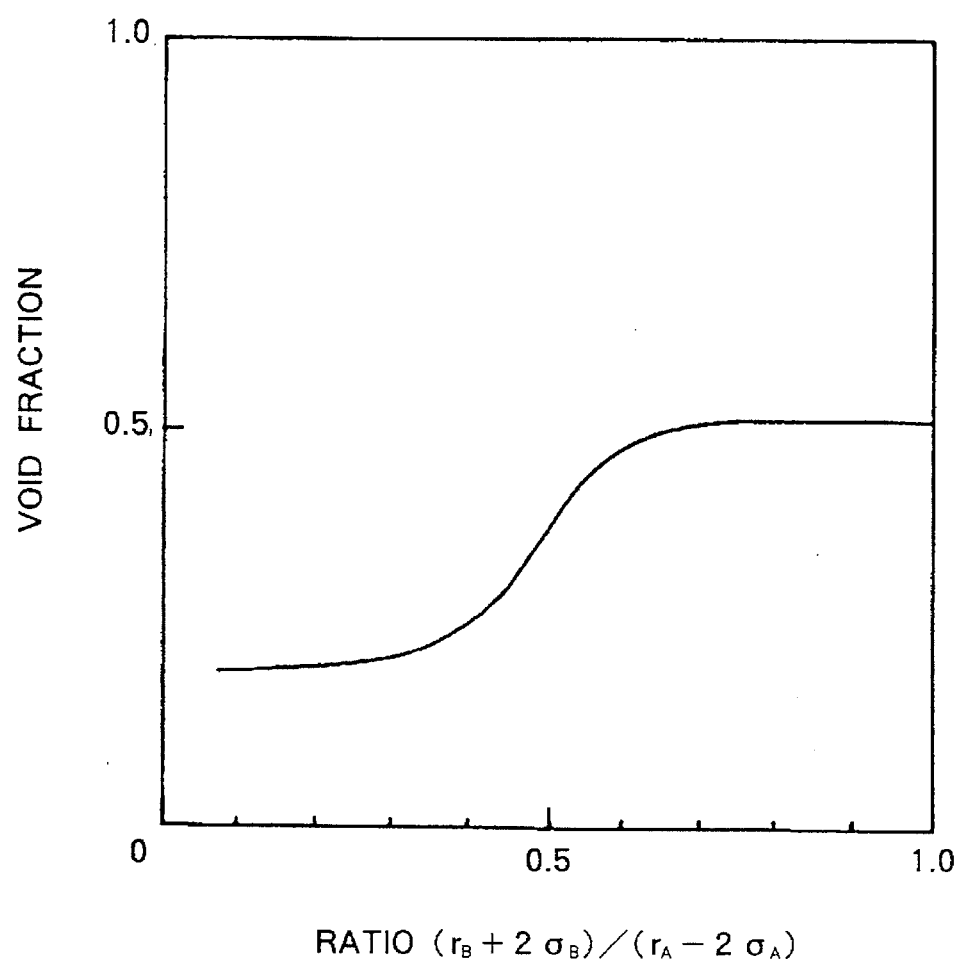
FIG. 18 is a graph showing the relationship between the ratio $(r_B+2_B)/(r_A-2_A)$ and the void fraction.
Figure 19:
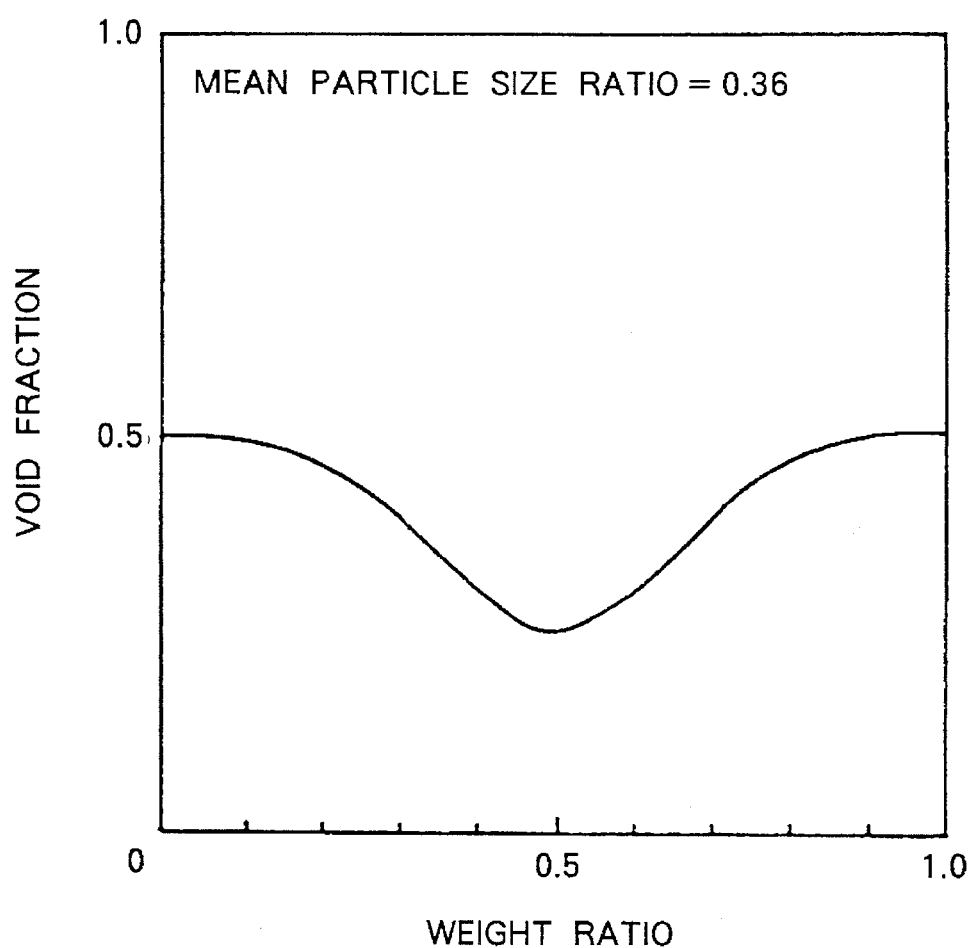
FIG. 19 is a graph showing the relationship between the weight ratio and the void fraction.

The standard deviation of normal distribution function of particle sizes of the powder A was expressed by $\sigma_A$, and the standard deviation of normal distribution function of particle sizes of the powder B by $\sigma_B$. Variations in the void fraction relative to the ratio $(r_B+2\sigma_B)/(r_A-2\sigma_A)$ were determined in the same manner as in Example 1. FIG. 18 shows the result. As will be apparent from the graph, the void fraction is generally constant when the ratio $(r_B+2\sigma_B)/(r_A-2\sigma_A)$ is not smaller than about 0.65 in the case where the two powders, different in particle-size distribution, are mixed together. However, the void fraction decreases greatly as the ratio decreases from about 0.65. Accordingly, the ratio $(r_B+2\sigma_B)/(r_A-2\sigma_A)$ should be up to 0.5, preferably up to 0.4, more preferably up to 0.3.

For the same reasion as stated in Example 1, the ratio $(r_B+2\sigma_B)/(r_A-2\sigma_A)$ should be at least 0.03.

EXAMPLE 3

In the same manner as in Example 1, particles different in size were prepared, which were then classified to obtain a powder A, 550 μm in mean particle size, and a powder B, 196 μm in mean particle size. The mean particle size ratio ($r_B/r_A$) of the two powders was 0.36. Next, the powders were mixed together in varying weight ratios of the powder B to the powder A ranging from 0 to 1, and the mixtures were checked for void fraction in the same manner as in Example 1. FIG. 18 showing the result reveals that to lower the void fraction, the weight ratio of the powder B of small mean particle size to the powder A of gerat mean particle size should be 0.2 to 0.8, preferably 0.3 to 0.7, more preferably 0.4 to 0.6.

EXAMPLE 4

Next, two kinds of powders, different in mean particle size, were mixed together in different mean particle size ratios and different weight ratios, and the mixtures were checked for void fraction. Table 1 shows the result. The powders used were prepared in the same manner as in the foregoing examples by pulverizing an ingot of LaNi$_5$ and classifying the resulting powder with sieves.

TABLE 1

| Sample No. | Mean particle size ratio | Weight ratio | Void fraction |
|---|---|---|---|
| 1 | 0.35 | 0.11 | 0.49 |
| 2 | 0.35 | 0.40 | 0.30 |
| 3 | 0.18 | 0.22 | 0.32 |

Although samples No. 1 and No. 2 have the same mean particle size ratio, sample No. 2 is 0.4 in weight ratio and is therefore smaller than sample No. 1 in void fraction. FIG. 17 of Example 1 shows that when the mean particle size ratio is 0.35, the void fraction is about 0.27. This value is still smaller than the void fraction of sample No. 2 because FIG. 17 shows data for a weight ratio of 0.5. Sample No. 3 is approximately the same as sample No. 2 in void fraction. Sample No. 3 is smaller than sample No. 2 in mean particle size ratio and also in weight ratio, and is therefore comparable thereto in void fraction.

These results indicate that the definition of the weight ratio, as well as of the mean particle size ratio, is important in packing the container to a high density.

EXAMPLE 5

Next, three kinds of powders, different in mean particle size, were mixed together, then packed into a container and checked for void fraction.

To prepare the powders, an ingot of LaNi$_5$ alloy was pulverized, and the resulting powder was classified with sieves into four fractions which were 550 μm, 155 μm, 95 μm and 35 μm, respectively, in mean particle size. Three of the four kinds of powders were selected and mixed together in such amounts that the weight ratio of the powder of the second largest particle size to the powder of the first largest particle size was 0.5, and that the weight ratio of the powder of the third largest particle size to the powder of the second largest particle size was 0.5. Table 2 shows the void fractions obtained.

TABLE 2

| Sample No. | Mean particle size (pm) | | | Particle size ratio | | Void fraction |
|---|---|---|---|---|---|---|
| | A | B | C | B/A | C/B | |
| 4 | 550 | 155 | 35 | 0.28 | 0.23 | 0.23 |
| 5 | 550 | 155 | 95 | 0.28 | 0.61 | 0.27 |

It is seen that samples No. 4 and No. 5 are both small in void fraction. Sample No. 5 is over 0.5 in the particle size ratio of the powder C (of the third largest particle size) to the powder B (of the second largest particle size), and is therefore slightly greater than sample No. 4 in void fraction.

The present example reveals that in the case where a container is to be packed with a mixture of powders classified respectively into at least three particle-size distribution groups which are different in mean particle size, a satisfactory void fraction is available if the particle size ratio of the powder of the second largest mean particle size to the powder of the first largest size is defined, namely, when the mixture is at least 0.03 to not greater than 0.50 in the ratio $r_2/r_1$ wherein $r_1$ is the mean particle size of the powder having the first largest mean particle size, and $r_2$ is the mean particle size of the powder having the second largest mean particle size.

A comparison between sample No. 4 and sample No. 5 indicates that when the mean particle size of the powder having the third largest mean particle size is $r_3$, the ratio $r_3/r_2$ is more preferably within the range of at least 0.03 to not greater than 0.50.

Accordingly, in the case where the container is to be packed with a mixture of powders classified respectively into at least three particle-size distribution groups which are different in mean particle size, it is desired that the mixture be at least 0.03 to not greater than 0.50 in the ratio $r_{N+1}/r_N$ wherein $r_N$ is the mean particle size of the powder having the particle-size distribution of the Nth largest mean particle size, and $r_{N+1}$ is the mean particle size of the pwoder having the particle-size distribution of the (N+1)th largest mean particle size.

EXAMPLE 6

Figure 16:
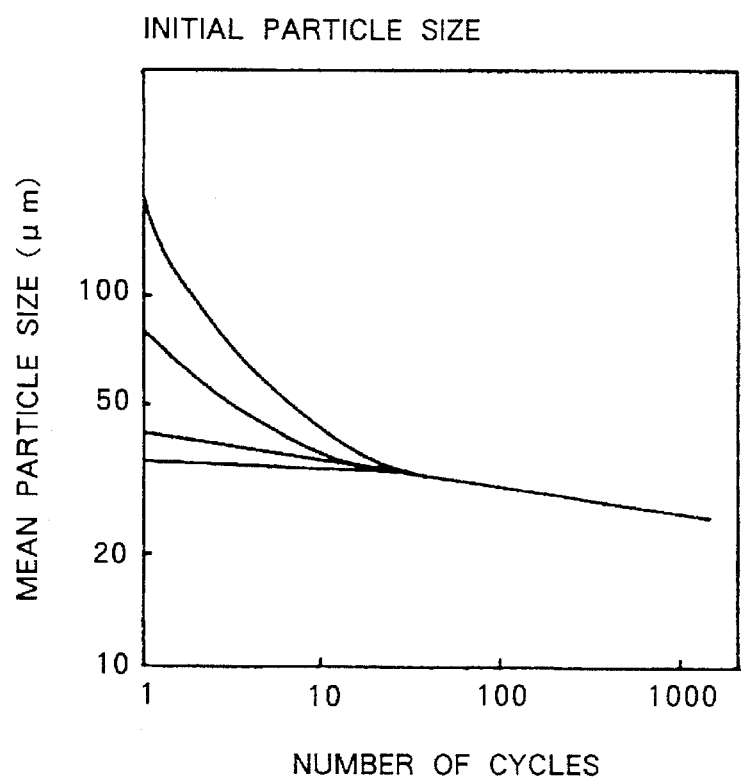
FIG. 16 is a graph showing mean particle size variations of hydrogen absorbing alloys which are different in mean particle size when the alloys were subjected to repeated hydrogen absorption-desorption cycles.

The hydrogen absorbing alloy filling a container repeatedly expands and contracts with the absorption and desorption of hydrogen, with the result that a great internal stress occurs in the particles, which are in turn broken to undergo pulverization. Four kinds of LaNi$_5$ alloy powders, about 260 μm, 80 μm, 42 μm and 36 μm in mean particle size, were subjected to repeated cycles of absorbing hydrogen under hydrogen pressure of 15 atm. and subsequently desorbing hydrogen. FIG. 16 shows the resulting variations in the mean particle sizes of the respective powders. As will be apparent from the graph, the larger the particle size, the more rapid is the progress of pulverization, and about 30 cycles reduce the particle sizes almost uniformly to about 32 μm.

When the hydrogen absorbing alloy is filled into the container, a high packing density can be achieved due to the particle size difference, whereas the repeated hydrogen absorption-desorption cycles render the powders uniform in particle size to result in the likelihood that the alloy will be unable to retain the initial mean particle size ratio because the alloy has the above-mentioned characteristics. Consequently, the container becomes no longer packed with a high density.

With the present example, therefore, the powder of smaller mean particle size to be used is an alloy which is higher than the powder of large mean size in the rate of progress of pulverization due to the absorption and desorption of hydrogen. However, when powders of different alloys are to be used in mixture, it is desirable to use alloys which are substantially identical in characteristics such as plateau pressure and plateau temperature from the viewpoint of hydrogen absorption-desorption efficiency.

EXAMPLE 7

A shaped body was prepared using LaNi$_5$ as a powder A of large mean particle size, MmNi$_{4.6}$Al$_{0.4}$ as a powder B of small mean particle size and a powder of polytetrafluoroethylene (PTFE) as a binder C. The alloy of the powder B corresponds to the alloy of the powder A wherein La is replaced by Mm (misch metal) with 0.4 atomic % of Ni further replaced by Al, greatly expands and contracts with the absorption and desorption of hydrogen, and is more amenable to size reduction than the powder A.

Figure 13:
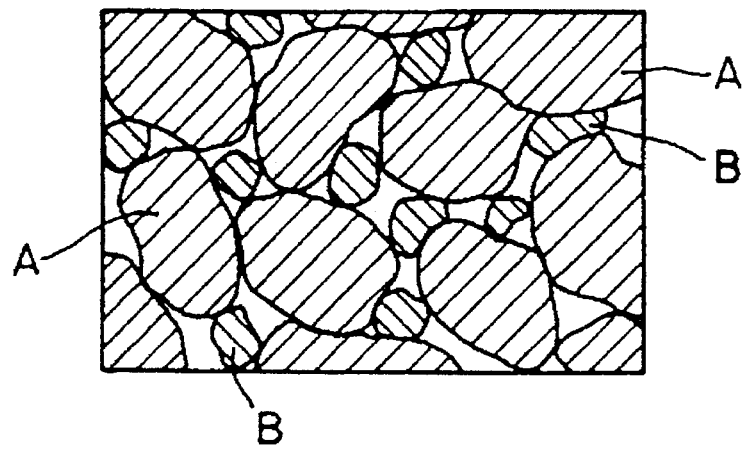
FIG. 13 is an enlarged schematic view in section showing a powder A and a powder B as mixed together.

As in the foregoing examples, each of the powders A and B was prepared by pulverizing an ingot of the alloy and classifying the resulting particles with sieves. The powder A was about 40 µm in mean particle size $r_A$, and the powder B was about 12 µm in mean particle size $r_B$. The mean particle size ratio $r_B/r_A$ was 0.3. The powders A and B were mixed together in the powder B to the powder A weight ratio of 0.5. FIG. 13 schematically shows the state of the mixture. The particles B of small size are trapped in the interstices between the particles A of large size to result in a higher packing density.

Figure 14:
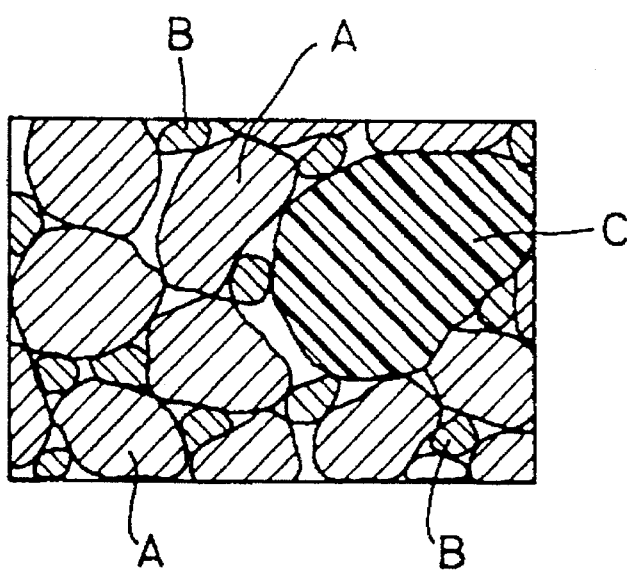
FIG. 14 is an enlarged schematic view in section showing the powder A, the powder B and a binder C as mixed together.
Figure 15:
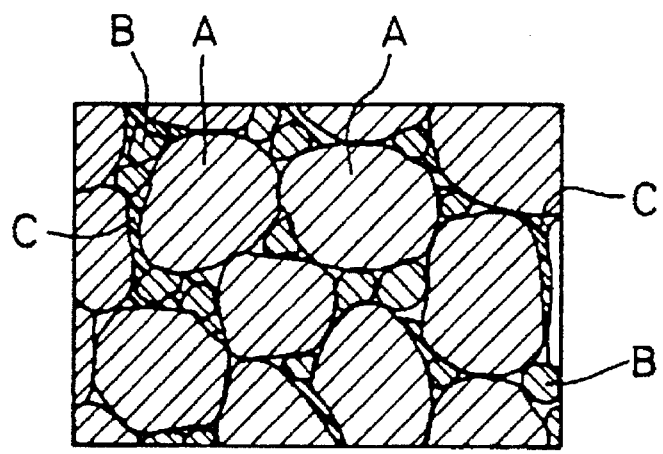
FIG. 15 is an enlarged schematic view in section showing the structure of a shaped body obtained by pressing the mixture of FIG. 14.

To the powder mixture was then added the binder powder, about 80 to about 100 µm in particle size, in an amount of 12 wt. % based on the powder mixture, followed by thorough mixing, and the resulting mixture was placed into a die and pressed under a pressure of 100 kg/cm$^2$ into a shaped body in the form of a disk, 15 mm in diameter and 11 mm in thickness. FIG. 14 schematically shows the powder A, powder B and binder C as mixed together. FIG. 15 schematically shows the state of the powders in the shaped body obtained. The particles of the binder C shown in FIG. 14 are made pastelike by pressing, penetrating into interstices between particles to join the particles to one another as seen in FIG. 15, but voids remain between particles for the passage of hydrogen gas.

Figure 20:
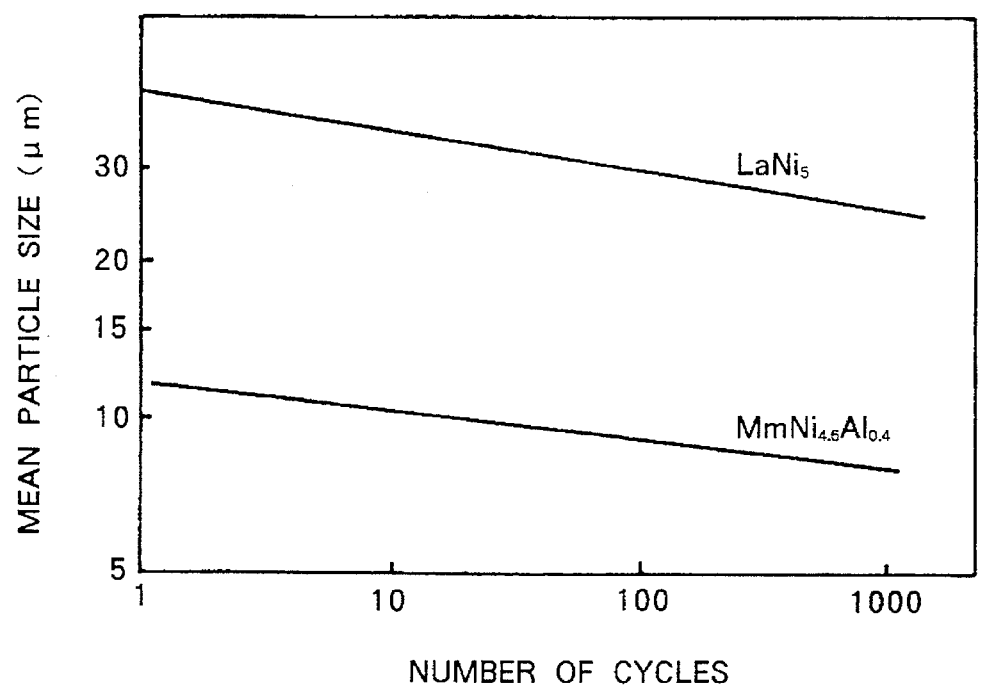
FIG. 20 is a graph showing mean particle size variations of two kinds of hydrogen absorbing alloys when the alloys were subjected to repeated hydrogen absorption-desorption cycles.

The shaped body obtained was packed into a container, subjected to repeated hydrogen absorption-desorption cycles and checked for mean particle size for every cycle. For the measurement, the shaped body was withdrawn from the container upon completion of every cycle, and a portion of the shaped body was cut off and checked for size distribution by a particle size meter. The resulting two peaks were taken as the mean particle size of the respective powders A and B. FIG. 20 shows the test result, revealing that the mean particle size ratio $r_B/r_A$ is 0.31 after 1000 cycles to remain almost unchanged from the initial value. This indicates that the shaped body remains packed in the container with a high density despite the hydrogen absorption-desorption cycles. The reason is as follows. An alloy which is sensitive to pulverization was used as the powder B which is small in mean particle size and therefore low in the rate of progress of side reduction so taht the powder B undergoes size reduction at a higher rate. Consequently, the powder B was reduced in size at approximately the same rate as the powder A which is large in mean particle size and undergoes size reduction at a high rate.

The binder must be used in an amount not to lower the alloy packing density. When the powders are compressed for shaping, the interstices between the particles diminish. Accordingly, if the binder is used in an amount permitting compression to diminish the interstices, the packing density will not be lower than the packing density attained by a loose mixture of the two kinds of powders.

To achieve a packing density higher than 50%, the amount of PTFE to be added should be up to about 30 wt. %, preferably up to about 20 wt. %, more preferably up to about 15 wt. %, in view of the result shown in FIG. 8 and previously described. However, presence of too small an amount of the binder fails to achieve the desired joining effect, so that at least 5 wt. % of the binder needs to be used.

The shaped body of the present invention contains a hydrogen absorbing alloy with a high density and can therefore be packed into a container with a high density, as it is or as suitably cut or treated in conformity with the inside shape of the container. Further even if the alloy becomes reduced in size by being subjected to repeated hydrogen absorption-desorption cycles, the allow retains the particle size ratio in the state of high-density packing. This obviates the likelihood that an internal stress will act on the container locally owing to the expansion of the alloy, consequently making it possible to reduce the size of containers of heat pumps, fuel cells, etc. utilizing the hydrogen absorbing alloy.

The foregoing embodiments and examples are intended to illustrate the present invention and should not be construed as limiting the invention defined in the appended claims or reducing the scope thereof. Furthermore the invention is not limited to the embodiments or examples in structure or feature but can of course be modified variously without departing from the spirit of the invention as set forth in the claims.

For example, the material of hydrogen absorbing alloys for use in the present invention are not limited to the La—Ni alloy and Mm—Ni alloy of the examples but include various alloys such as Fe—Ti alloys and Ti—Mn alloys. The alloy powders to be used include those prepared by mechanical pulverization and also those prepared by atomization. Further the binder to be used in the present invention is not limited to PTFE; also usable are polyethylene oxide (PEO), polyvinyl pyrrolidone (PVP) and other high poymer materials.

What is claimed is:

1. A hydrogen absorbing alloy shaped body comprising a press shaped mixture of a first hydrogen absorbing alloy powder A having a first particle-size distribution, a second hydrogen absorbing alloy powder B having a second particle-size distribution and a binder C, wherein the powder A has a larger mean particle size than the powder B, wherein the mean particle size ratio $r_B/r_A$ of the powder B to the powder A, wherein $r_A$ and $r_B$ are the mean particle sizes of the respective powder A and B, is at least 0.03 to not greater than 0.50.

2. A hydrogen absorbing alloy shaped body as defined in claim 1 wherein the hydrogen absorbing alloy of the powder B has a higher rate of progress of pulverization resulting from absorption and desorption of hydrogen than does alloy A.

3. A hydrogen absorbing alloy shaped body as defined in claim 1 wherein the weight ratio of the powder B to the powder A is at least 0.2 to not greater than 0.8.

4. A hydrogen absorbing alloy shaped body as defined in claim 1 comprising at least one of said shaped bodies packed in a closed container.

5. A hydrogen absorbing alloy shaped body as defined in claim 1 wherein said binder comprises 5 to 30 wt. % of said shaped body.

6. A hydrogen adsorbing alloy shaped body as claimed in claim 1 wherein said alloy powders are selected from the group consisting of lanthanum-nickel, mischmetal-nickel, iron titanium and titanium manganese.

7. A hydrogen absorbing alloy shaped body comprising a pressed mixture of a first hydrogen absorbing alloy powder A, having a first particle-size distribution, a second hydrogen absorbing alloy powder B having a second particle-size distribution, and a binder C, wherein the mean particle size of the powder A is larger than that of the powder B, wherein the mixture has a ratio $(r_B+2\sigma_B)/(r_A-2\sigma_A)$, wherein $r_A$ is the mean particle size of the powder A, $\sigma_A$ is the standard deviation of normal distribution function of particle sizes of the powder A, $r_B$ is the mean particle size of the powder B, and $\sigma_B$ is the standard deviation of normal distribution function of particle sizes of the powder B, of at least 0.03 to not greater than 0.50.

8. A hydrogen absorbing alloy shaped body as defined in claim 7 wherein the hydrogen absorbing alloy of the powder B has a higher rate of progress of pulverization resulting from absorption and desorption of hydrogen than does alloy A.

9. A hydrogen absorbing alloy shaped body as defined in claim 7 wherein the weight ratio of the powder B to the powder A is at least 0.2 to not greater than 0.8.

10. A hydrogen absorbing alloy shaped body as defined in claim 7 comprising at least one of said bodies packed in a closed container.

11. A hydrogen absorbing alloy shaped body as defined in claim 7 wherein said binder comprises 5 to 30 wt. % of said shaped body.

12. A hydrogen absorbing alloy shaped body as defined in claim 7 wherein the binder is at least one high polymer material selected from the group consisting of polytetrafluoroethylene, polyethylene oxide and polyvinyl pyrrolidone.

13. A hydrogen absorbing alloy shaped body as defined in claim 7 wherein the binder is polytetrafluoroethylene.

14. A hydrogen adsorbing alloy shaped body as claimed in claim 7 wherein said alloy powders are selected from the group consisting of lanthanum-nickel, mischmetal-nickel, iron titanium and titanium manganese.

* * * * *